United States Patent [19]

Duncan et al.

[11] Patent Number: 4,913,754

[45] Date of Patent: Apr. 3, 1990

[54] MANUFACTURE OF BETA-ALUMINA ARTIFACTS

[75] Inventors: James H. Duncan, Stafford, England; Rodney J. Stead, Duffield, Great Britain

[73] Assignee: Lilliwyte Societe Anonyme, Luxembourg

[21] Appl. No.: 252,500

[22] Filed: Sep. 30, 1988

[30] Foreign Application Priority Data

Oct. 6, 1987 [GB] United Kingdom ............... 8723408

[51] Int. Cl.⁴ .................. B32B 18/00; B32B 31/26
[52] U.S. Cl. ........................... 156/85; 156/86; 156/89
[58] Field of Search ............... 156/85, 86, 89

[56] References Cited

U.S. PATENT DOCUMENTS

| | | | |
|---|---|---|---|
| 3,564,328 | 2/1971 | Bagley et al. | 156/89 |
| 4,038,462 | 7/1977 | Rohr | 429/30 |
| 4,132,820 | 1/1979 | Mitoff | 428/137 |
| 4,299,638 | 11/1981 | Matsuhisa | 156/86 |
| 4,721,541 | 1/1988 | Hodges | 156/89 |

FOREIGN PATENT DOCUMENTS

| | | |
|---|---|---|
| 1505987 | 4/1978 | United Kingdom . |
| 2018013 | 10/1979 | United Kingdom . |
| 2141655A | 1/1985 | United Kingdom . |

OTHER PUBLICATIONS

J. R. Redding et al., Novel Ceramic Bonding Techniques for $CO_2$ Waveguide Lasers (1987), pp. 269–287.

*Primary Examiner*—Caleb Weston
*Attorney, Agent, or Firm*—Arnold, White & Durkee

[57] ABSTRACT

The invention provides a method of making a composite beta-alumina artifact, such as a separator tube for an electrochemical cell, comprising two beta-alumina portions which are sealed together in a sealing zone, namely an inner portion and an outer portion which extends peripherally around the inner portion and embraces it in the sealing zone. The method comprises pressing the inner and outer portions from powders which, when sintered, shrink and form integral beta-alumina artifacts. The portions are then arranged so that the outer portion extends around the inner portion and embraces it in a sealing zone. The portions are then sintered to cause them to seal together hermetically in the sealing zone while converting each of the portions into a beta-alumina artifact. The portions are made so that the outer portion undergoes a greater degree of shrinkage during sintering than the inner portion and the portions are pressed so that the spacing between the portions where the outer portion extends around and embraces the inner portion is such that, upon sintering, the outer portion shrinks on to the inner portion to provide a hermetic peripheral seal between the portions.

6 Claims, 5 Drawing Sheets

MANUFACTURE OF BETA-ALUMINA ARTIFACTS

This invention relates to the manufacture of beta-alumina solid electrolyte separators for use in high temperature rechargeable electrochemical cells. More particularly the invention relates to a method of making such a separator tube of the type which comprises an inner tube portion located within and extending along an outer tube portion, the tube portions being hermetically sealed together at one end thereof and defining an electrode compartment of annular cross-section therebetween.

According to the invention there is provided a method making a beta-alumina solid electrolyte separator tube for a high temperature rechargeable electrochemical cell, which tube comprises an inner tube portion located within and extending along the interior of an outer tube portion, the tube portions being hermetically sealed together at one end of the separator tube and defining an electrode compartment of annular cross-section therebetween, the method comprising pressing an inner tube portion which is open at one end thereof and closed at the other, from a powder which, when sintered, shrinks and forms an integral beta-alumina artifact;

pressing an outer tube portion which is open at both ends thereof, from a powder which also, when sintered, shrinks and forms an integral beta-alumina artifact;

arranging the tube portions so that the inner tube portion is located within and spaced from the outer tube portion and extends along its interior; and sintering the tube portions to cause them to seal together hermetically at said one end of the separator tube while converting each of the tube portions into an integral beta-alumina artifact, the tube portions being made such that the outer tube portion undergoes a greater degree of shrinkage in radius during sintering than the inner tube portion, and at least one of the tube portions being pressed to have a shaped zone at said one end of the separator tube, so that there is a radial spacing between the tube portions at said one end of the separator tube which is less than the radial spacing elsewhere between the tube portions and which, before firing, is less than the difference between the decrease in inner radius of the outer portion upon sintering and the decrease in the outer radius of the inner portion upon sintering.

In other words, upon sintering, the outer tube portion shrinks in radius to a degree sufficient to eliminate the reduced clearance between the tube portions at said one end thereof, so that they become hermetically sealed and sintered together at said shaped zone.

It is well known that a variety of starting powders, comprising essentially aluminium oxide and the hydrates thereof, can be sintered at temperatures of the order of 1500°–1650° C. to form integral or unitary artifacts comprising essentially beta-alumina, and, if the appropriate amounts of soda and lithia and/or magnesia are added to certain of these powders, artifacts of the preferred form of beta-alumina, namely beta"-alumina, can similarly be obtained. Such starting materials, apart from powders of beta-alumina itself, include alpha-alumina, theta-alumina, boehmite, bayerite, gibbsite, aluminas derived via chemical routes from organometallics, etc.

The Applicant has found that certain of these starting materials, when sintered to form beta-alumina tubes from tubes pressed from powder, undergo different degrees of shrinkage in radius, which differences permit the method of the present invention to be carried out. Furthermore, blends of such powders can be employed, which exhibit a degree of shrinkage intermediate the degrees of shrinkage exhibited by the components of the blend. This shrinkage results from a reduction in volume of the starting material upon sintering, and, as the various starting materials have different densities but provide a product, namely beta-alumina, of relatively increased density which is substantially constant regardless of the starting material, they undergo different volume decreases which lead to different degrees of radial shrinkage of tubes pressed from powders thereof.

It is accordingly possible to select suitable powders for the inner and outer tube portions, or such powders can be formed by blending, to exhibit desired different degrees of radial shrinkage upon firing. Suitable heat treatment of powders, e.g. calcination to temperatures of e.g. 900°–1400° C., can also be used, before pressing the tube portions, to alter the degree of radial shrinkage exhibited upon sintering; and altering the pressure at which the tube portions are pressed from the powders to vary the density of the tube portions before sintering; can also affect the degree of radial shrinkage exhibited. It is thus possible, within limits, to tailor-make the degree of radial shrinkage exhibited by a tube portion upon sintering, to permit the tube portions to be pressed, and optionally machined thereafter, to obtain radial spacings therebetween at said one end thereof which permit the method of the present invention to be carried out.

Typically, tubes or tube portions of the type in question are pressed, e.g. by isostatic pressing, at pressures in the range of about 70–280 MPa (10 000–40 000 psi), using a polyurethane or the like mould or sleeve to contain the powder to be pressed around a mandrel, which can be accurately dimensioned and can have a smooth surface of e.g. polished stainless steel. At the ends of the tube portions where they are to be sealed together, it is thus possible easily to form the outer portion with an inner sealing surface, for sealing to the inner portion, of smooth surface finish and dimensions which are accurate within sufficiently small tolerances to promote good sealing. However, in the case of the inner portion, its outer surface is formed against a polyurethane or the like mould or sleeve, leading to reduced dimensional accuracy in terms of constant diameter and surface finish. The invention accordingly contemplates, as indicated above, the step of machining an outer sealing surface on the inner portion for sealing to the outer portion. Conveniently, the outer portion is pressed on a mandrel having a neck which provides a necked-in the outer portion, the inner surface of which neck forms the sealing surface of the outer portion, and the inner portion is pressed with a zone of increased wall thickness at its said one end, which zone may then be dry-machined on a lathe to a suitable diameter and surface smoothness. Naturally, this zone should be machined to be as smooth as possible, but in practice routine experimentation can be employed to determine adequate tolerances for a good hermetic seal.

In other words, the method may include forming an outer sealing surface on the inner tube portion at said open end thereof, for sealing to the outer tube portion, by pressing the inner tube portion from powder so that it has a zone at its said open end of a wall thickness which is greater than its wall thickness elsewhere, and is of greater outer diameter than the outer diameter of the inner portion elsewhere, and machining said zone to reduce its outer diameter, thereby to provide the outer sealing surface thereon; and the pressing of the outer tube portion may be on to a mandrel having a neck, the outer tube portion being pressed to have a zone at one end thereof of a wall thickness greater than its wall thickness elsewhere, and the neck of the mandrel being located at said one end so that said zone forms a neck in the outer tube portion leading into the interior of the outer portion at said one end, the inner surface of the neck forming a sealing surface of reduced diameter relative to the inner diameter of the remainder of the outer tube portion, for sealing to the inner tube portion.

In use it is intended to have one electrode of a cell outside the outer portion and inside the inner portion, and the other cell electrode in the space between the portions. As these electrodes are separated by the tube, the inner portion is thus pressed so that it is closed at one end and open at the other, and the outer portion is pressed so that it is open at both ends, the sealing surface of the inner portion being provided at or adjacent the open end of the inner portion.

While the radial spacing between the sealing surface of the outer tube portion and the sealing surface of the inner tube portion before sintering must naturally be less than the difference between the decrease in radius upon shrinking of the sealing surface of the outer portion and the decrease in radius upon sintering of the sealing surface of the inner portion, said radial spacing between the tube portions at said one end of the separator tube is preferably less than 0.1 mm.

While good results have been obtained with a pressed outer tube portion material which exhibits a percentage linear reduction upon sintering which is only 1% greater than the percentage linear reduction exhibited by the pressed inner tube portion material (e.g. a 25% reduction for the outer portion as opposed to a 24% reduction for the inner portion), a good working value is 5% greater than that of the pressed inner tube material (e.g. a 25% reduction as opposed to a 20% reduction). In this regard it should be noted that linear reductions or shrinkages as mentioned herein are expressed as a percentage of the fired or shrunken product.

In other words, the powders from which the inner and outer tube portions are pressed, may be selected so that, upon sintering, the outer tube undergoes a percentage linear reduction in size, measured as a percentage of its shrunken size, which is greater than the percentage linear reduction in size undergone by the inner tube portion, measured as a percentage of its shrunken size, by a numerical value of at least 1; and the numerical value is preferably at least 5.

In this regard it should be noted that, probably because at the sintering temperatures the tube materials are in a more or less plastic state, relatively large differences of the order of 14% or more in linear reduction of the portions can be accommodated without cracking of either of the tube portions. Fine-grained sintered beta-alumina products, such as those derived from certain boehmites, may have an advantage in this respect (see Example 2 hereunder).

As examples of how the shrinkage characteristics of the inner and outer tube portions can be varied or selected, it is to be noted that alpha-alumina-derived starting materials exhibit a linear reduction of 14–15% on firing, whereas boehmite-derived starting materials exhibit a reduction of 28–31%, and starting materials derived from a mixture with a boehmite:alpha-alumina mass ratio of 70:30 exhibit a reduction of 24–27.5%. When the boehmite-derived powder is however calcined to a temperature in the range 900°–1400° C. before pressing, a reduction in linear shrinkage to a value of 19–22.5% can be obtained.

As regards differences in shrinkage obtainable for the same starting material for the inner and outer tube portions by altering the powder pressing pressure, it should be noted that these are typically relatively small, and it should be borne in mind that the outer tube portion which is pressed at the lower pressure should nevertheless be pressed at a pressure sufficient to provide it with adequate physical properties after sintering. If this pressure is too low, the sintered density of the outer tube portion can be unacceptably low.

The Applicant has carried out the method using a variety of starting powders, and the tests conducted indicate that any aluminium oxide powders of the type mentioned above can be used for the method, provided that they sinter to form beta-alumina artifacts, and provided that they exhibit a sufficient difference in shrinkage. Adequate sealing can easily be tested by using an ultra-violet fluorescent dye and/or by vacuum testing. A tube produced by the method has been employed as a separator in a high temperature cell having molten sodium in contact with one side of the separator and a stoichiometrically exact $NaAlCl_4$ molten salt electrolyte in contact with the other side of the separator, the cell having said sodium as its anode and a $Ni/NiCl_2$ cathode in contact with the molten salt electrolyte. The cell was run through 20 charge/discharge cycles before failing, the cell failure being apparently unassociated with any seal failure.

The invention extends also to a separator when made according to the method described herein, and to an electrochemical cell including such separator.

While the invention has been described above with particular reference to a method of making a beta-alumina solid electrolyte separator tube for a high temperature rechargeable electrochemical cell, it will be appreciated that it can in principle also be employed for making composite beta-alumina artifacts which are not necessarily solid electrolyte separator tubes. Such artifacts will have two beta-alumina portions which are sealed together in a sealing zone, one of the portions extending peripherally around the other to embrace it in the sealing zone in more or less spigot/socket fashion in the way in which the outer tube portion surrounds the inner tube portion in the solid electrolyte separator tube described above. Furthermore, while the outer and inner portions, in the sealing zone, will typically be circular or cylindrical/annular in cross-section, they need not have this cross-section, and can in fact be non-circular in cross-section where they seal together in the sealing zone. Naturally, the artifact can have more than one seal of this type.

Accordingly, the present invention extends broadly to a method of making a composite beta-alumina artifact comprising two beta-alumina portions which are sealed together in a sealing zone, namely an inner portion and an outer portion which extends peripherally around the inner portion and embraces it in the sealing zone, the method comprising pressing the inner and outer portions from powders which, when sintered, shrink and form integral beta-alumina artifacts;

arranging the portions so that the outer portion extends around the inner portion and embraces it in a sealing zone; and sintering the portions to cause them to seal together hermetically in the sealing zone while converting each of the portions into a beta-alumina artifact, the portions being made so that the outer portion undergoes a greater degree of shrinkage during sintering than the inner portion and the portions being pressed so that the spacing between the portions where the outer portion extends around and embraces the inner portion is such that, upon sintering, the outer portion shrinks on to the inner portion to provide a hermetic peripheral seal between the portions.

The invention will now be described, with reference to the following illustrative non-limiting Examples, and to the following diagrammatic drawings in which.

Figure 1:
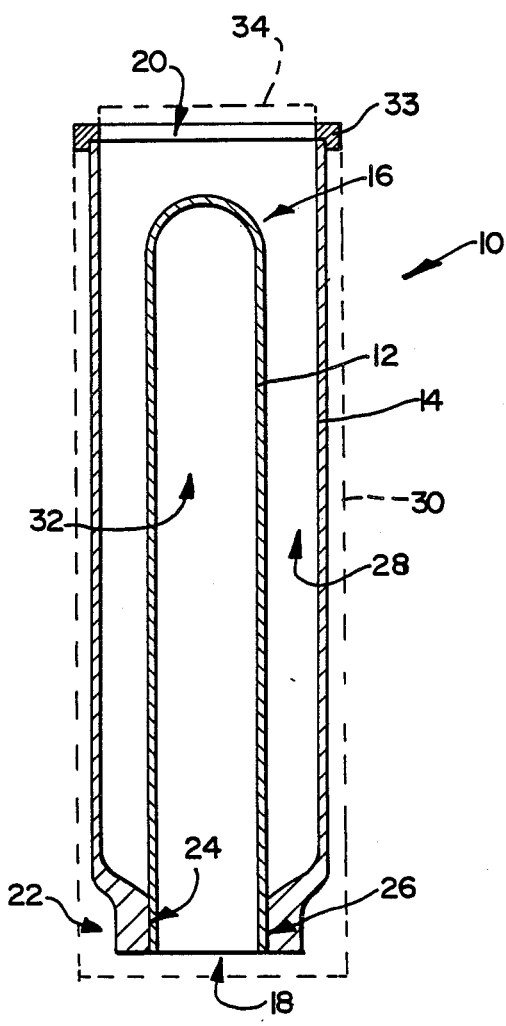
FIG. 1 shows a schematic sectional side elevation of a separator tube made according to the method of the present invention.

In FIG. 1 of the drawings reference numeral 10 generally designates a separator tube made in accordance with the method of the present invention. The tube 10 comprises an inner tube portion 12 and an outer tube portion 14. The inner tube portion 12 has a closed end 16 and an open end 18 and is cylindrical, extending concentrically along substantially the full length of the interior of the outer tube portion 14, which is also cylindrical. The outer tube portion 14 is open at each end thereof, namely at its end 20 adjacent the closed end 16 of the tube portion 12, and at its opposite end 22, which is necked-in.

The necked-in end 22 of the tube portion 14 has a cylindrical inner sealing surface 24 which is hermetically sealed by sintering to a machined outer sealing surface 26 provided on the end 18 of the inner tube portion 12.

The outer tube portion 14 is spaced from the inner tube portion 12 by a space 28 of annular cross-section, which in use provides an electrode compartment in an electrochemical cell. The other electrode compartment of the cells is provided between the tube 10 and a cell housing shown in broken lines at 30. In use either the space 28 can be an anode compartment containing e.g. sodium, with the cathode compartment, containing e.g. an NaAlCl$_4$ molten salt electrolyte and a Ni/NiCl$_2$ cathode, being between the housing 30 and the tube 10; or the cathode can be in the space 28 with the anode between the tube 10 and housing 30. In either case, however, it will be appreciated that the interior 32 of the inner tube portion 12 will form an extension of the electrode compartment which is defined between the tube 10 and housing 30, and is in communication therewith via the open end 18 of the inner tube portion 12.

Typically the cell will be used in the upright condition shown, with open end 18 of the tube portion 12 lowermost. The end 20 of the outer tube portion 14 will typically be glass-sealed to an alpha-alumina ring 33, which ring 32 is in turn sealed to the housing 30 and to a tube closure 34 shown in broken lines, thereby to seal off the anode compartment from the cathode compartment.

Figures 1A, 1B:
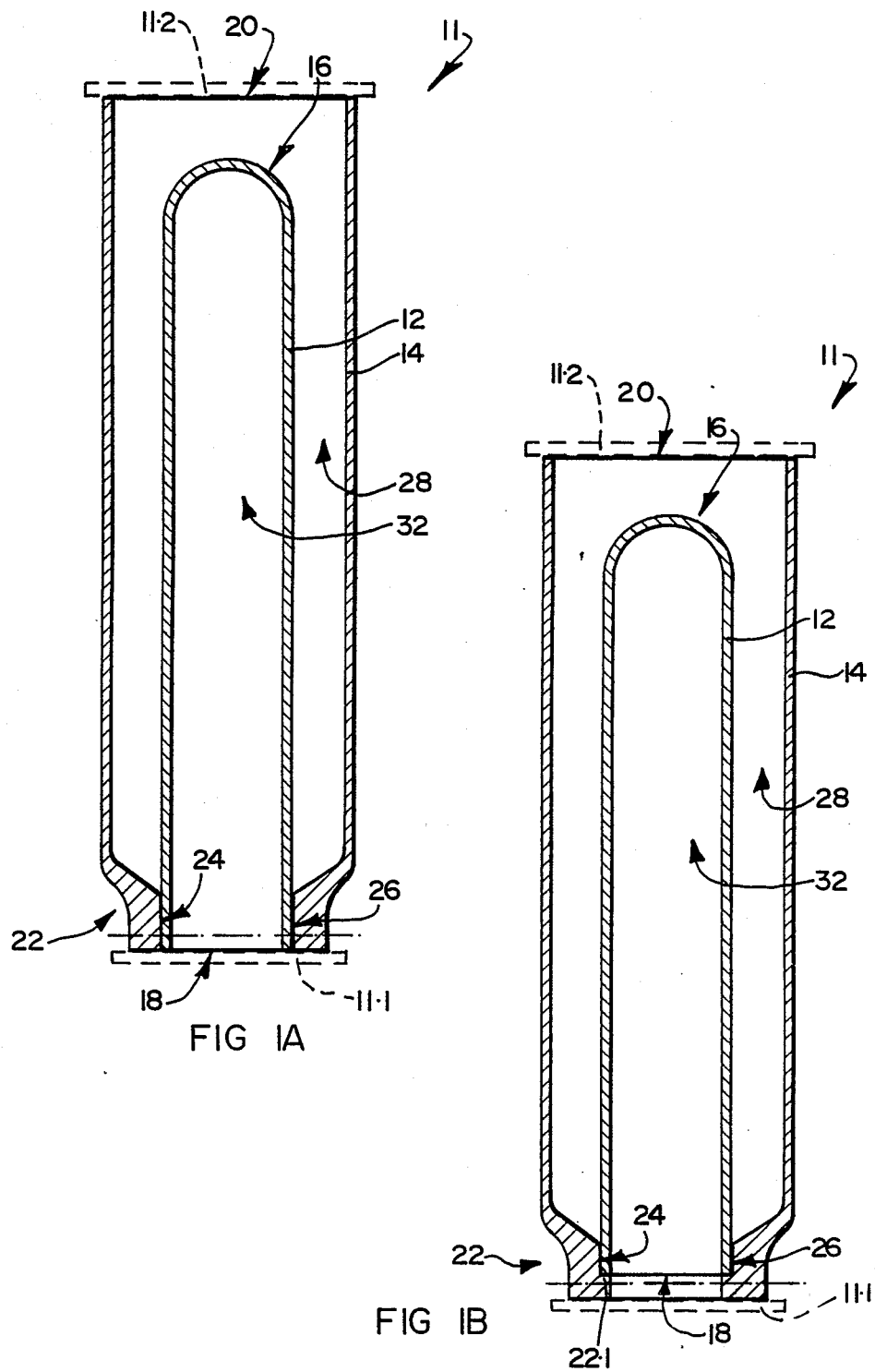
FIGS. 1A to 1D show views similar to FIG. 1 of possible tube portion arrangements prior to firing.
Figures 1C, 1D:
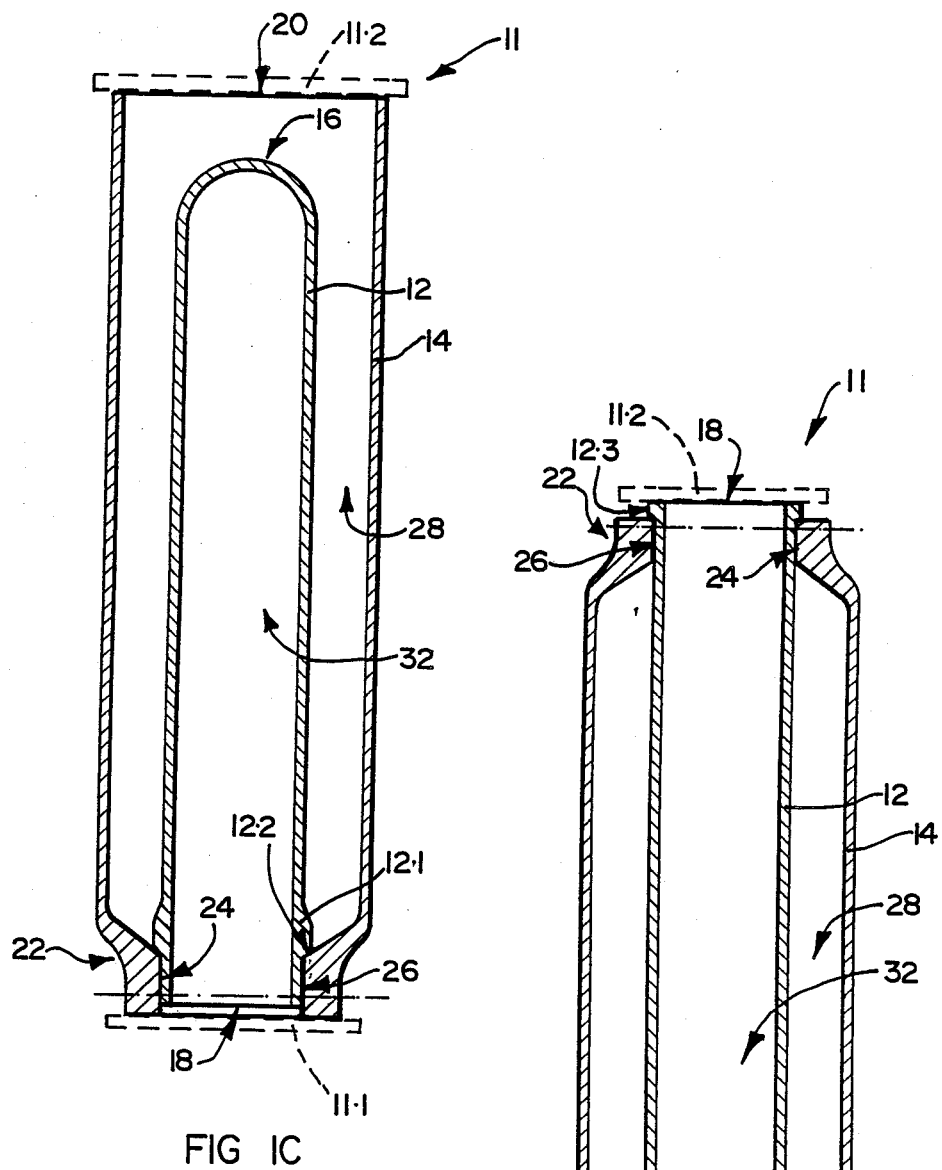

When firing takes place to form the tube 10 from the tube portions 12, 14 as described in Examples 6 and 7 hereunder, firing will usually take place with the tube 10 in an upright condition with the open end 18 of the inner tube portion 12 either lowermost as shown in FIG. 1 of the drawings, or uppermost. When said open end 18 of the portion 12 is lowermost, i.e. adjacent the hearth of the furnace, both tube portions 12, 14 may rest on a support (see FIG. 1A hereunder). Instead, the outer tube portion may rest on a support and an inwardly projecting circumferentially extending step 22.1 (see FIG. 1B) can be machined in the necked-in end 22 of the outer portion 14, to stand radially inwardly proud of the sealing surface 24, adjacent the lower or free edge of the necked-in end 22, to define the lower boundary of said sealing surface 24. Prior to firing the open end 18 of the inner portion 12 can rest on this step 22.1. A further possibility (see FIG. 1C) is to provide the inner tube portion 12 with a circumferential outwardly bulging collar 12.1 adjacent its open end 18 whereby it engages and rests at 12.2 on the outer portion 14 at the periphery of the inner end of the sealing surface 26, with the open end 18 of the portion 12 spaced axially inwardly from the axially outer end of the sealing surface 24.

When the open end 18 of the inner portion 12 is uppermost, i.e. with the tube 10 inverted relative to its condition in FIG. 1 so that said open end 18 is remote from the furnace hearth (see FIG. 1D), a radially outwardly projecting circumferential shoulder 12.3 can be machined on the outer surface of the portion 12, at its open end 18, to define the axially outer boundary of the sealing surface 26. This shoulder will stand proud of the sealing surface 26 in a radially outer direction, and the inner tube portion 12 can be supported from the outer tube portion 14, by hanging via this shoulder from the axially outer, and in this arrangement uppermost, surface of the necked-in end 22 of the outer portion 14.

As indicated above, FIGS. 1A–1D show possible arrangements for the tube portions 12 and 14 prior to firing, the same reference numerals being used to designate the same parts as in FIG. 1, unless otherwise specified. In each case the arrangement is designated 11 and is shown supported on the customary disc 11.1, with the upper end of the arrangement 11 closed off by the customary disc 11.2. The discs 11.1 and 11.2 are shown in broken lines and are pressed from unfired powder of the same type as is used to press the unfired tube portions 12, 14, as is known in the art, and are used to support and close the tube portions during firing, as they shrink at substantially the same rate as the tube portions during firing, and assist in keeping the tube portions round during firing, particularly at the ends of the tube portions which are in contact with the discs. In FIGS. 1A–1D the radial spacing between the sealing surfaces 24, 26 is omitted for ease of illustration. After firing, the separator tube may be finished off by slicing off the outer end of the seal at 24,26, e.g. with a diamond saw, at the position shown by the chain-dotted lines in FIGS. 1A–1D.

EXAMPLES

Various tests have been carried out by the Applicant to show the feasibility of the method of the present invention. For these arrangement tests, starting powders were prepared having different shrinkages upon firing, as follows:

POWDER 1

This powder was prepared by spray drying a wet milled (by a vibro-energy mill) mixture containing 50% by mass solids in water of Cera Hydrate boehmite, obtained from B A Chemicals Plc, Gerrards Cross, Buckinghamshire, England. This boehmite had been calcined to a temperature of 700° C. before wet milling. Lithia and soda were added thereto, to provide a lithia content of 0.72% by mass and a soda content of 9.55% by mass. This powder exhibited, upon firing to beta-alumina, a linear size reduction of 28–31% with respect to its linear dimensions after firing.

POWDER 2

This powder was prepared in a substantially similar way to Powder 1 with wet milling and spray drying, with the substantial difference that 30% by mass of the boehmite was replaced by an alpha-alumina prior to calcining, the alpha-alumina being that available from Alcoa (Great Britain) Limited, Droitwich, Great Britain, under the trade designation A-16 SG. The lithia content of the powder was 0.71% by mass, and the soda content was 9.1% by mass. This powder exhibited a shrinkage upon firing of 24–27.5% with respect to the linear dimensions of the fired product.

POWDER 3

This powder was prepared from the same boehmite as Powder 1 in an essentially similar fashion, except that, after spray-drying, the spray-dried powder was fired to 1250° C. for a period of 1 hour to convert the powder to beta"-alumina. The fired beta"-alumina powder was then again wet-milled with water at a 50% by mass solids content and again spray-dried prior to pressing. In this case the lithia content was 0.7% by mass and the soda content of 9.0% mass, and the powder exhibited a linear shrinkage upon firing of 19–22.5%, based on the dimensions after firing.

POWDER 4

In this case the starting powder was pure Alcoa A-16 SG alpha-alumina. It was prepared in a similar fashion to Powders 1 and 2, having a lithia content of 0.7% by mass and a soda content of 9.1% by mass.

It should be noted that all of Powders 1 to 4 were materials of a particle size of less than 45 microns, and that the lithia and soda contents were given on a dry basis in each case, with the balance of the powder in each case being $Al_2O_3$.

Preliminary tests were carried out to establish what effect the isostatic pressure used to press the powder into tubes had on the ultimate density of the tubes and on the shrinkage exhibited during firing by the tubes. Results are set out in the following table, Table 1.

TABLE 1

| Pressing pressure (mPa) | Powder Number | Fired Density ($g/cm^2$) | Fired Shrinkage (% with respect to linear dimensions of fired tube) |
|---|---|---|---|
| 70 | 2 | 3,106 | 31,50 |
|  | 3 | 3,176 | 26,77 |
| 105 | 2 | 3,188 | 31,37 |
|  | 3 | 3,206 | 25,90 |
| 140 | 2 | 3,191 | 29,62 |
|  | 3 | 3,211 | 24,86 |
| 175 | 2 | 3,193 | 28,73 |
|  | 3 | 3,203 | 23,22 |
| 203 | 2 | 3,200 | 28,03 |
|  | 3 | 3,199 | 22,83 |
| 28 | 2 | 3,203 | 27,41 |
|  | 3 | 3,203 | 22,06 |

Tests were carried out using Powder 3 in which the inner tube portions were pressed at a higher pressure than the outer tube portions, and wherein successful hermetic sealing was obtained. Details of these tests are given in Example 5 hereunder.

Figure 2:
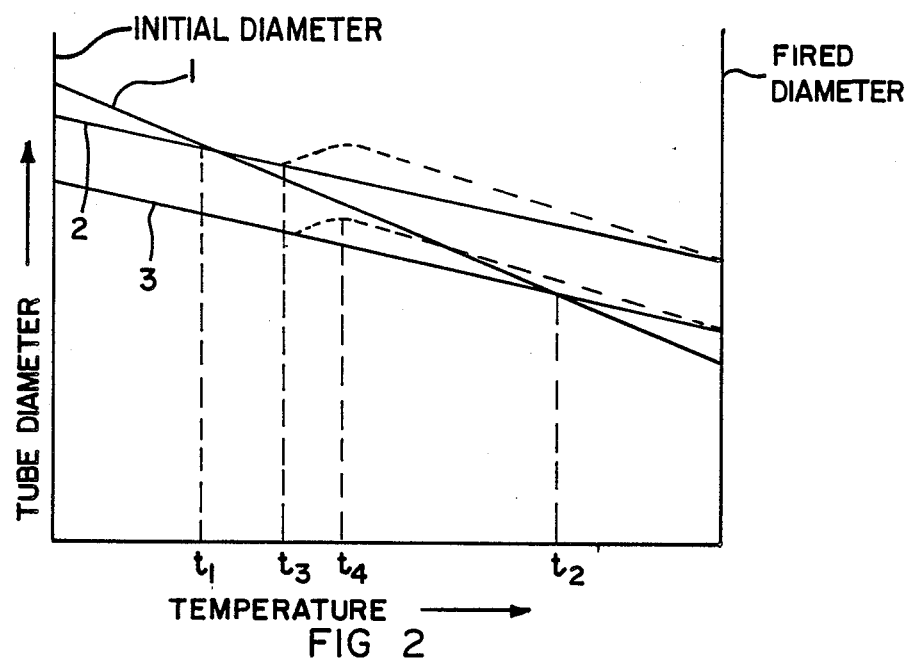
FIG. 2 shows a plot of tube diameter against temperature during firing.

With reference to the examples which follow, FIG. 2 shows in simplified form plots of diameters of tube portions which are shrinking during firing, for two different powders which shrink by different amounts when they are heated over the same temperature range. Plots for three different tube portions are shown, Plot 1 being for a tube portion formed from one of the powders which shrinks at a relatively high rate, the plot having a steep slope, and Plots 2 and 3 being for tube portions formed from the other powder which shrinks relatively more slowly, so that these plots have a shallower or flatter slope than Plot 1. Plots 2 and 3 have the same slope, but are for tube portions with different starting diameters.

In FIG. 2 Plot 1 is of the inner diameter of the outer tube portion, whereas Plots 2 and 3 are of the outer diameters of the inner tube portions. If the tube portion of Plot 1 is arranged concentrially around the tube portion of Plot 2 or the tube portion of Plot 3, then upon firing through the same temperature range, the outer surface of the inner tube portion will come into contact with the inner surface of the outer tube portion, at the temperatures at which the various plots cross.

Thus, the tube portion of Plot 1 will come into contact with the tube portion of Plot 2 at a temperature $t_1$ which is lower than the temperature $t_2$ at which the tube portion of Plot 1 comes into contact with the tube portion of Plot 3, bearing in mind that the tube portion of Plot 2 has a larger outer diameter than the tube portion of Plot 3. During heating, when the tube portion of Plot 2 is inside the tube portion of Plot 1, these tubes will be in contact for a longer period and over a greater temperature range than would be the case for the tube portion of Plot 3 inside the tube portion of Plot 1, when heated between the same initial and final temperatures, at the same rate. This arises from the fact that the radial gap between the tube portion of Plot 1 and the tube portion of Plot 2 is smaller than the radial gap between the tube portion of Plot 1 and the tube portion of Plot 3. With regard to FIG. 2, it should be noted that tube portions made of certain powders can, during shrinking as their temperatures rise during firing, undergo a reversal over a limited temperature range intermediate the minimum and maximum temperatures, during which they expand in linear dimensions rather than contract.

This temporary expansion and the subsequent shrinkage is shown for Plot 2 and Plot 3 in FIG. 2 in broken lines. The expansion takes place between temperatures $t_3$ and $t_4$, e.g. at a temperature in the vicinity of 1200° C., where aluminium oxide converts to beta-alumina.

When the radial gap between the inner and outer tube portions is small, as in the case of Plot 1 and Plot 2, the expansion of the inner portion which takes place between temperatures $t_3$ and $t_4$ can cause high strain to be experienced between the tube portions at a relatively low temperature at which the tube portions are relatively non-plastic, with the danger of tube damage, particularly to the outer tube portion. With an increased radial gap, such as that between the tube portion of Plot 1 and the tube portion of Plot 3, contact takes place at a higher temperature between the tube portions, and strain caused by the expansion of the inner tube portion between temperatures $t_3$ and $t_4$ can be compensated for, so as to reduce the risk of failure.

Naturally, if the outer tube portion expands over the same temperature range $t_3$–$t_4$ to an extent not less than the expansion of the inner tube portion, this problem need not arise, and a smaller initial radial gap can be employed to promote good sealing.

EXAMPLE 1

Various tubes were pressed from Powders 1 to 4. Pressing was at a pressure of about 238 mPa and was by isostatic pressing, tooling dimensions being selected so as to produce inner tube portions and outer tube portions, wherein the outer diameter of the inner tube portions as pressed, was close to but slightly smaller than the inside diameter of the outer tube portions. All thicknesses of the tube portions were of the order of 1.5–2.0 mm.

Figure 3:
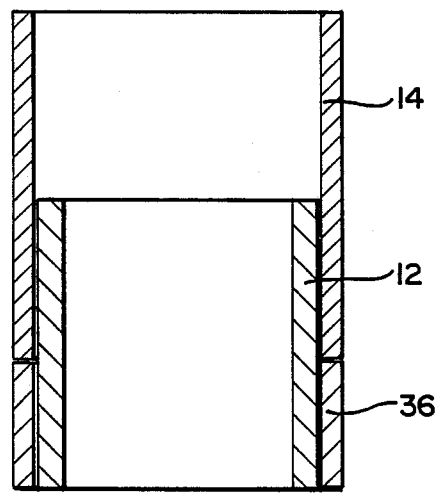
FIG. 3 shows a sectional side elevation of a test arrangement for testing the method of the invention.

After pressing, the various tube portions were cut into lengths of about 30–50 mm, and assembled into test arrangements or assemblies in accordance with FIG. 3. In FIG. 3 an inner tube portion is designated 12 and an outer tube portions is designated 14. In these test arrangements the tube portions 12, 14 were arranged in a substantially vertical upright condition, the outer tube portion 14 being supported at its lower end by a supporting tube 36 of substantially the same dimensions as the outer tube portion 14, but made of the same material as the inner tube portion 12. Firing was then carried out to a temperature of 1617° C., according to the firing schedule:

20° C.—1400° C. at 200° C./hr
1400° C.—1600° C. at 100° C./hr
1600° C.—1617° C. at 60° C./hr
1617° C.—hold for 20 minutes In this case, and in the succeeding Examples, the tube portions were supported in the usual way for tubes of the type in question, in magnesia liners or crucibles to minimize loss of sodium vapour generated during firing.

This firing was followed by cooling at the natural furnace cooling rate. After cooling, vacuum tests were carried out on each assembly, and sections of the assemblies were examined. It was found that sintering had taken place between the inner tube portions 12 and outer tube portions 14, but that this sintering was not sufficiently continuous to form hermetically sealed joints. The vacuum tests confirmed that such joints were not hermetically sealed.

In these tests the powders used for the inner and outer tube portions in each assembly, and the outer diameter of each inner tube portion, together with the inner diameter of each outer tube portion, are shown in the following table, Table 2:

TABLE 2

| Assembly No | Inner Tube/ Portion Powder | Inner Tube Portion Outer Diameter (mm) | Outer Tube Portion Powder | Outer Tube Portion Inner Diameter (mm) |
| --- | --- | --- | --- | --- |
| 1 | Powder 2 | 37,45 | Powder 1 | 37,5 |
| 2 | Powder 2 | 37,1 | Powder 1 | 37,5 |
| 3 | Powder 3 | 36,8 | Powder 1 | 37,5 |
| 4 | Powder 3 | 37,2 | Powder 1 | 37,5 |
| 5 | Powder 4 | 37,3 | Powder 1 | 37,5 |
| 6 | Powder 3 | 36,8 | Powder 2 | 37,75 |

EXAMPLE 2

Further tube portions were pressed by isostatic pressing using Powders 1 to 4, and these tube portions were pressed as outer tube portions and inner tube portions, the inner tube portions having a lower inner diameter than that of the outer tube portions.

The outer surface of each inner tube portion was machined on a lathe using a tool tip having a radius of 1 mm, to provide a final depth of cut of 0.05 mm at a feed rate of 0.04 mm/revolution.

Figure 4:
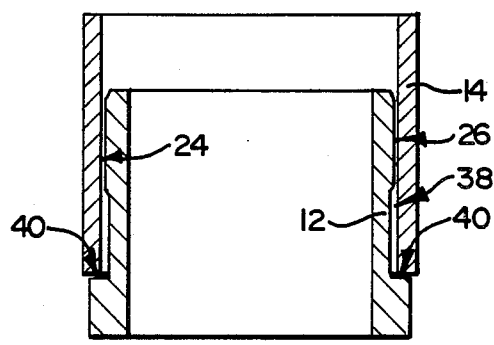
FIG. 4 shows a view similar to FIG. 3 of a further similar test arrangement.
Figure 5:
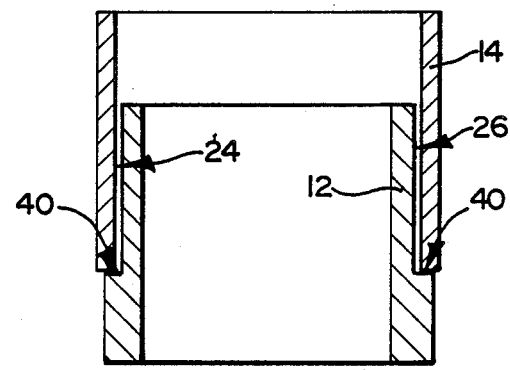
FIG. 5 shows a view similar to FIG. 3 of another similar test arrangement.

The various inner and outer tube portions were assembled into test assemblies of the type shown in FIG. 4 or FIG. 5.

In FIG. 4, the inner tube portion is again shown by reference numeral 12 with the outer tube portion being shown by reference numeral 14.

Each inner tube portion 12 is machined to have, at one end thereof, a sealing surface 26 of diameter 0.05 mm smaller than the as-pressed inner diameter of the sealing surface of the outer tube portion as shown at 24.

Axially inwardly of the sealing surface 26 the inner tube portion 12 is machined to have a zone of reduced diameter at 38, of diameter 0.3 mm less than that of the sealing surface 24. The inner tube portion 12 is machined to have a shoulder 40 defining the axially inner boundary of the zone 38 of reduced diameter, which shoulder acts to support the lower end of the outer tube portion 14.

In the case of FIG. 5, the construction is essentially similar to that of FIG. 4, and the same reference numerals are used for the same parts, unless otherwise specified, the essential difference being that the zone of reduced diameter 38 is omitted.

In each case after firing according to the firing schedule set forth in Example 1 above, hermetic seals were obtained between the sealing surfaces 26, 24 of the tube portions 12, 14 respectively. Vacuum testing showed that the seals were in fact hermetic, having a helium leak rate of less than $1 \times 10^{-8}$ standard ml/sec air equivalent, adequate for separating an anode from a cathode in an electrochemical cell.

The way in which the various tubes were assembled, and the powders from which they were made are set forth in the following table, Table 3:

TABLE 3

| Assembly No. | Type of Assembly | Inner tube Powder | Outer Tube Powder |
| --- | --- | --- | --- |
| 7 | FIG. 4 | 3 | 2 |
| 8 | FIG. 4 | 3 | 1 |
| 9 | FIG. 4 | 2 | 1 |
| 10 | FIG. 5 | 3 | 2 |

TABLE 3-continued

| Assembly No. | Type of Assembly | Inner tube Powder | Outer Tube Powder |
|---|---|---|---|
| 11 | FIG. 5 | 4 | 1 |

Figure 6:
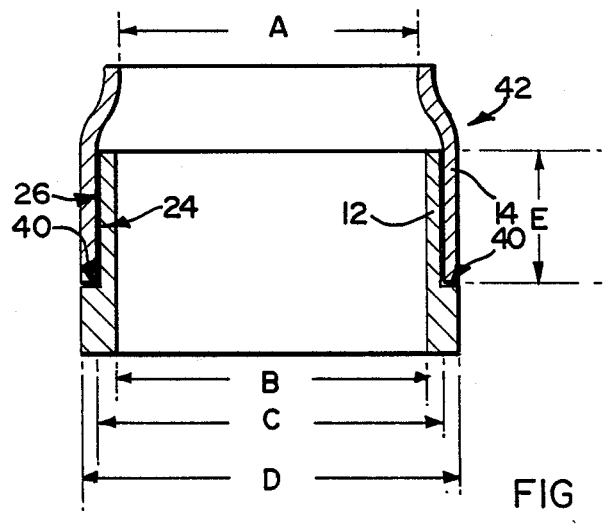
FIG. 6 shows the view of FIG. 5 after firing.

With particular reference to Assembly No. 11, where Powder 1 was used for the outer tube portion, the inner tube portion 12 had its sealing surface 26 machined, unlike the sealing surfaces of the inner tube portions of assemblies 1 to 4 (which had an outer diameter of 0.05 mm smaller than the as-pressed inner diameter of their outer tube portions), to an inner diameter 0.6 mm less than that of the sealing surface 24 of the outer tube portion 14, the sealing surface 26 being 39.2 mm and that of the sealing surface 24 being 39.8 mm. In this case it was found that the part of the outer tube portion 14 which overlapped the inner tube portion 12 was substantially distorted by the firing, because of the difference between its shrinkage and that of the inner tube portion. This distortion is shown in FIG. 6, in which the same reference numerals are used as in FIG. 5. In FIG. 6, the various dimensions of the tube portions, after firing, are shown respectively at A to E, being as follows:

| A | 31,15 mm |
| B | 30,35 mm |
| C | 34.40 mm |
| D | 36,20 mm |
| E | 13,5 mm |

However, even in the case of this Assembly no. 11, in which there was considerable distortion as shown in FIG. 6, testing by means of a penetrant dye test disclosed no surface cracks in either the inner portion 12 or outer portion 14.

With regard to Assembly 11, it should be noted that the 0.6 mm difference in diameters between the sealing surfaces 26 and 24, was set at this increased value to cater for possible expansion of the inner portion 12, which was made from Powder 4.

It should also be noted that, in general, when sections of the seals or joints between the inner tube portions 12 and outer tube portions 14 of the assemblies of Example 2 were inspected, the part of each inner tube portion 12 in contact with the associated outer tube portion 14 via the sealing surfaces 26, 24, was found, to a depth of 50 microns in the radial direction from the sealing interface, to have enhanced density and reduced porosity. This would appear to result from the compressive forces exerted thereon by the outer tube portion during shrinking.

It should further be noted that those assemblies, i.e. Assemblies Nos. 7 to 9, in Example 2, employing the assembly type shown in FIG. 4, not only had sealing across the interface between the sealing surfaces 26 and 24, where there had been an initial 0.5 mm difference in diameter, but there was also sealing and sintering between the inner portion 12 and outer portion 14 at the zone 38 where this difference in diameter was 0.3 mm. Accordingly it appeared that the shrinkage of the outer tube portion was in each case sufficient to take up this 0.3 mm difference in diameter and nevertheless formed a vacuum-tight or hermetic seal between the tube portions 12, 14 opposite said zone 38 of reduced diameter. Sealing at the zone of reduced diameter 38 would have taken place later during sintering, than sealing between the surfaces 26, 24, but appeared to be equally effective.

EXAMPLE 3

Two tube assemblies were made of the type shown in FIG. 5, using Powder 3 for the inner tube portion 12 and Powder 2 for the outer tube portion 14. As with Example 2, the sealing surface 26 of each inner tube portion 12 was machined to a diameter 0.05 mm less than that of the sealing surface 24 of the corresponding outer tube portion 14, the final depth of cut being 0.05 mm at a feed rate of 0.04 mm/revolution. In the one case the tool tip had a radius of 0.05 mm and in the other case the tool tip had a radius of 5 mm.

Firing was according to the firing schedule of Example 1, except that in each case the inner tube portions were pre-fired to 900° C. prior to machining, being heated at a temperature of 200° C./hr to said 900° C. and held at 900° C. for 10 minutes, prior to cooling at the natural furnace cooling rate. This was done simply to provide the inner tube portions with appropriate strength to permit good machining.

Vacuum testing of these two assemblies found them to be as hermetically leak-tight as those of Example 2.

EXAMPLE 4

Example 3 was repeated for a further two assemblies with the difference that in both cases the inner tube portion was machined using a tool having a tip radius of 0.05 mm, a feed rate of 0.125 mm/revolution being used for the inner tube portion of the one assembly and a feed rate of 0.18 mm/revolution being used for the inner tube portion of the other assembly.

In both cases hermetically leak-tight assemblies were obtained after firing.

EXAMPLE 5

Example 3 was repeated for a further five tube assemblies, with the difference that Powder 3 was used both for each inner tube portion and also for each outer tube portion. In each case, however, the outer tube portion was isostatically pressed to a lower pressure than the corresponding inner tube portion of its assembly. A 0.05 mm tool tip radius was employed again for machining to a final depth of cut of 0.05 mm, employing a feed rate of 0.04 mm/revolution. The inner tube portions were pre-fired to 900° C. as described for difference in diameter between the sealing surfaces of the tube portions Examples 3 and 4, the again being about 0.05 mm. The assemblies were fired according to the firing schedule of Example 1. Details are set out in the following table, Table 4:

TABLE 4

| Assembly No | Inner Tube Pressure (mPa) | Outer Tube Pressure (mPa) | Machined Inner Tube Diameter (mm) | Outer Tube Inner Diameter (mm) | Average Firing Density of assembly (g/cm³) |
|---|---|---|---|---|---|
| 12 | 238 | 238 | 39,72 | 39,77 | 3,221 |
| 13 | 238 | 203 | 39,67 | 39,73 | 3,221 |
| 14 | 238 | 175 | 39,66 | 39,71 | 3,213 |
| 15 | 238 | 140 | 39,64 | 39,69 | 3,221 |
| 16 | 238 | 105 | 39,61 | 39,67 | 3,213 |

With regard to these assemblies, the percentage firing shrinkage for each tube portion was the same as that indicated for the corresponding pressure for Powder 3 in Table 1 hereinabove. Of these assemblies, Assembly 12, not surprisingly, failed the vacuum test, Assemblies 13 to 16 all passing it and having hermetic seals.

This example was surprising that it demonstrated that small differences in firing shrinkages were sufficient to cause the inner and outer tube portions to sinter together successfully to form hermetic seals.

EXAMPLE 6

Examples 1 to 5 employed short tube lengths. In the present Example, however, assemblies were constructed suitable for use as solid electrolyte separator tubes in electrochemical cells, each inner tube portion 12 and each outer tube portion 14 having the shape shown in FIG. 1, so that each assembly had the shape of the composite tube 10 shown in FIG. 1.

In each case Powder 2 was used for the outer tube portion 14, and was isostatically pressed at 238 mPa to give an inner diameter of 68.5 mm, except that the sealing surface 24 (see FIG. 1) which was pressed on the necked-in end 22 to have an inner diameter of 43.75 mm. This sealing surface 24 had a length in the axial direction of the tubes of between 10 and 20 mm, the wall thickness of the tube 14 radially outwardly of the sealing surface 24 being in the range 3 to 12 mm.

Powder 3 was used for each inner tube portion 12, and was similarly isostatically pressed at 238 mPa to have an inner diameter of 39.4 mm and an outer diameter of 42.7 mm, with a thickened portion (not shown in FIG. 1) adjacent the open end 18 of the tube portion 12 having an outer diameter of 44.2 mm, to provide the sealing surface 26.

Both tube portions 12, 14 were machined at their sealing surfaces 26, 24 without pre-firing to 900° C. This machining increased the diameter of the sealing surface 24 of the outer tube 14 to 44.0 mm, and decreased the outer diameter of the inner tube portion sealing surface 26 to about 43.95 mm, to provide a difference in diameter of 0.05 mm between the sealing surfaces 26, 24 in the assembly before firing.

Three assemblies were prepared in the fashion described above, together with a fourth in which the sealing surface 26 of the inner portion 12 was machined to provide a shoulder at its axially outer boundary, for abutment against the axially outer end of the outer tube portion 14. As described hereinabove with reference to (although not shown in) FIG. 1, this permitted the assembly to be oriented in inverted condition when compared with the orientation of FIG. 1, with the open end 18 of the inner tube 12 of this assembly uppermost and remote from the hearth in a furnace, with the inner tube portion 12 hanging via said shoulder from the upper end of the outer tube portion 14.

After sintering according to the firing schedule set forth in Example 1, all four assemblies were found to be hermetically leak-tight.

The composite tube assembly having the shoulder on its inner portion 12 was assembled into an electrochemical cell having a molten sodium anode and a Ni/NiCl$_2$ cathode of the type described above with reference to FIG. 1, and was operated for 22 charge/discharge cycles, before failing, the failure being unrelated to the seal between the inner and outer tube portions.

EXAMPLE 7

Example 6 was repeated with a single tube assembly, except that in this case both the inner and outer tube portions were pre-fired to 900° C. before machining. In this case also the composite tube assembly 10 produced (FIG. 1) was found to be hermetically vacuum tight.

EXAMPLE 8

An inner tube portion of the type shown in FIG. 5 was formed from Powder 4, the powder being pressed at 238 mPa to form a tube portion having an inner diameter of 35.0 mm. This inner tube portion was pre-fired to 900° C. as described for Example 3 and its outer surface was machined to provide a sealing surface 24 having an outer diameter of 38.9 mm in the fashion described in Example 2. This tube portion was then sintered according to the firing schedule set forth in Example 1. After this sintering the outer diameter of the tube portion was found to have an average value of 33.87 mm.

An outer tube portion 14 was pressed from Powder 1 at 238 mPa to have an inner diameter of 35.1 mm and an average outer diameter of 40.4 mm. This outer tube portion was not pre-fired before pressing. The inner and outer tube portions were then assembled into an assembly as shown in FIG. 5, and the assembly as a whole was then fired in accordance with the firing schedule of Example 1. The difference in diameter between the machined sintered sealing surface 26 of the inner tube portion 12 (33.87 mm) and the diameter of the sealing surface 26 of the outer portion 14 (35.1 mm) was 1.23 mm.

After firing an assembly of the type shown in FIG. 6 was obtained, but with the outer tube portion 14 somewhat more distorted than that shown in FIG. 6, the outer tube portion having an inner diameter of 25.45 mm, which was in fact less than the inner diameter of the inner tube portion which was 30.45 mm.

The seal or joint between the inner and outer tube portions appeared to be intact and continuous, with sintering between the tubes, and when subjected to a dye test, no dye was found to penetrate the joint. The seal was found to be hermetically vacuum tight.

It was observed from this assembly that the outer tube portion shrank by an exceptionally high degree in the radial direction, where it was unsupported by the inner tube portion, from an inner diameter of 35.1 mm to a value of 25.45 mm. The Applicant believes that this arises from the fact that at least part of the outer tube portion may have been restricted in its ability to shrink in the axial direction, so that, to maintain the normal degree of volume shrinkage, this tube portion shrunk by an exceptional amount in the radial direction.

The outer tube portion was found to exhibit only minimal traces of surface damage due to distortion at the position (see 42 in FIG. 6) where the change in diameter between that part of the outer tube portion supported by the inner tube portion, and the unsupported part of the outer tube portion, occurred.

EXAMPLE 9

Example 8 was repeated but using Powder 3 for the outer tube portion. Again, sintering between the tube portions was found to have taken place, with the seal intact and hermetically leak-tight, and as in the case of Example 8 there was found to be minimal evidence of surface damage owing to distortion next to the seal area.

EXAMPLE 10

Example 8 was repeated, using Powder 4 for the outer tube portion. In this case, sintering of the tube portions was found to have taken place, with the seal intact and hermetically leak-tight, but there was found to be marked damage to the outside of the outer tube portion where distortion at 42 at the change of its diameter took place.

An advantage of the invention is that it provides a method of making a separator tube which is essentially cylindrical in shape and can easily be made by isostatic pressing, but which also has a high surface area available for ion conduction relative to its volume, leading to potentially high power densities without a substantial increase in cell mass. It is a further advantage of the invention that the sealing arising from the shrinkage and sintering takes place at elevated temperatures at which the tube materials are relatively plastic. Stresses arising from the differences in shrinkage should thus in principle be promptly relieved, resulting in a relatively stress-free tube after cooling, which in use should not be unduly stressed by changes in temperature ranging from ambient temperatures to normal operating temperatures in a cell of e.g. 200°–300° C. As far as the seal between the inner and outer portions is concerned, post mortem tests have indicated that there is a substantial proportion of crystalline beta-alumina at the seal which is common to the material of both portions, i.e. bridging the interface at the sealing surfaces. Furthermore, even when the sealing surface of the inner portion is relatively coarsely machined on a lathe, to form a spiral groove thereon, adequate sealing has occurred at the tops of the ridges between adjacent grooves, with small pores remaining at said grooves which do not adversely affect sealing.

As the method of the present invention has been found to have utility with boehmite powders, alpha-alumina powders, and mixtures thereof, the Applicant believes that there is no reason why the invention should not extend to the sealing of alumina artifacts in general, and indeed to the forming of artifacts from any ceramics which exhibit shrinkage of the type in question upon sintering.

The invention accordingly extends to a method of forming ceramic artifacts from prefabricated components, the method comprising prefabricating at least two components by pressing them from ceramic powders which, when sintered, form integral artifacts, the components being formed so that one of the components has a male sealing surface and the other of the components has a female sealing surface, the one component being receivable in the other so that the sealing surfaces are in contact with or closely spaced from each other, the components being made so that the one component during sintering undergoes a lesser degree of shrinkage than the other component, the method including arranging the components so that the one component is received by the other with the sealing surfaces in contact with each other, to form a composite assembly, and sintering the assembly to cause the components to form integral artifacts, and the spacing between the sealing surfaces being such that, upon shrinkage of the components, the greater degree of shrinkage of said other component causes the female sealing surface to grip the male sealing surface and to sinter thereto.

As indicated above, the sealing surfaces will typically be right cylindrical in shape, although the possibility is contemplated that they may taper, or indeed be rectangular in cross-section. Apart from making composite tubes for cell separators as described above, it is contemplated that the method of the present invention will also have utility in sealing insulating collars, for example alpha-alumina, magnesia or zirconia collars (see 32 in FIG. 1) to such separator tubes.

We claim:

1. A method of making a beta-alumina solid electrolyte separator tube for a high temperature rechargeable electrochemical cell, which tube comprises an inner tube portion located within and extending along a major proportion of the length of the interior of an outer tube portion, the full length of the inner tube portion being located within the outer tube portion so that it is enclosed thereby, the tube portions being hermetically sealed together at one end of the separator tube and defining an electrode compartment of annular cross-section therebetween, which annular electrode compartment extends along the full length of the inner tube portion and along a major proportion of the length of the outer tube portion, the method comprising pressing an inner tube portion which is open at one end thereof and closed at the other, from a powder which, when sintered, shrinks and forms an integral beta-alumina artifact;

pressing an outer tube portion which is open at both ends thereof, from a powder which also, when sintered, shrinks and forms an integral beta-alumina artifact, the outer tube portion being pressed of a length and inner diameter respectively greater than the length and outer diameter of the inner tube portion and so that the inner portion can extend along a major proportion of the length of the interior of the outer portion;

arranging the tube portions so that the inner tube portion is located along its full length within the outer portion and extends lengthwise along the interior of the outer portion so that it is radially spaced from the outer tube portion; and sintering the tube portions by heating them to a maximum temperature of 1500°–1650° C. to cause them to seal together hermetically at said one end of the separator tube while converting each of the tube portions into an integral beta-alumina artifact, the tube portions being made such that the outer tube portion undergoes a greater degree of shrinkage in radius during sintering than the inner tube portion, and at least one of the tube portions being pressed to have a shaped zone at said one end of the separator tube, so that there is a radial spacing between the tube portions at said one end of the separator tube which is less than the radial spacing elsewhere between the tube portions and which, before firing, is less than the difference between the decrease in inner radius of the outer portion upon sintering and the decrease in the outer radius of the inner portion upon sintering, and so that, during and after the hermetic sealing together of the tube portions at said shaped zone, said radial spacing elsewhere between the tube portions remains.

2. A method as claimed in claim 1, which includes forming an outer sealing surface on the inner tube portion at said open end thereof, for sealing to the outer tube portion, by pressing the inner tube portion from powder so that it has a zone at its said open end of a wall thickness which is greater than its wall thickness elsewhere, and is of greater outer diameter than the outer diameter of the inner portion elsewhere, and machining said zone to reduce its outer diameter, thereby to provide the outer sealing surface thereon.

3. A method as claimed in claim 1, in which the pressing of the outer tube portion is on to a mandrel having a neck, the outer tube portion being pressed to have a zone at one end thereof of a wall thickness greater than its wall thickness elsewhere, and the neck of the mandrel being located at said one end so that said zone forms a neck in the outer tube portion leading into the interior of the outer portion at said one end, the inner surface of the neck forming a sealing surface of reduced diameter relative to the inner diameter of the remainder of the outer tube portion, for sealing to the inner tube portion.

4. A method as claimed in claim 1, in which the radial spacing between the tube portions at said one end of the separator tube where the tube portions are sealed together is, before the sintering, less than 0.1 mm.

5. A method as claimed in claim 1, in which the powders from which the inner and outer tube portions are pressed, and the pressures at which they are pressed, are selected so that, upon sintering, the outer tube undergoes a percentage linear reduction in size, measured as a percentage of its shrunken size, which is greater than the percentage linear reduction in size undergone by the inner tube portion, measured as a percentage of its shrunken size, by a numerical value of at least 1.

6. A method as claimed in claim 5, in which the numerical value is at least 5.

* * * * *

UNITED STATES PATENT AND TRADEMARK OFFICE
CERTIFICATE OF CORRECTION

PATENT NO. : 4,913,754

DATED : April 3, 1990

INVENTOR(S) : James H. Duncan, Rodney J. Stead

It is certified that error appears in the above—identified patent and that said Letters Patent is hereby corrected as shown below:

Column 8, line 6, (Table 1), change "g/cm$^2$" to --g/cm$^3$--.

Column 16, line 1, change reference number "32" to --33--.

Signed and Sealed this

Twenty-eighth Day of August, 1990

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,913,754

DATED : April 3, 1990

INVENTOR(S) : James H. Duncan and Rodney J. Stead

It is certified that error appears in the above—identified patent and that said Letters Patent is hereby corrected as shown below:

In Table 1, column 8, line 15, change "28" to --238--.

Signed and Sealed this

Twenty-first Day of July, 1992

Attest:

DOUGLAS B. COMER

Attesting Officer

Acting Commissioner of Patents and Trademarks